July 25, 1961  F. T. MONAHAN, JR., ET AL  2,993,209
DIVING FACE MASK
Filed Aug. 11, 1959
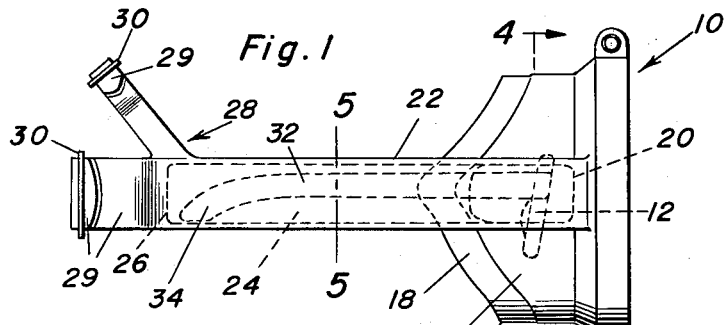
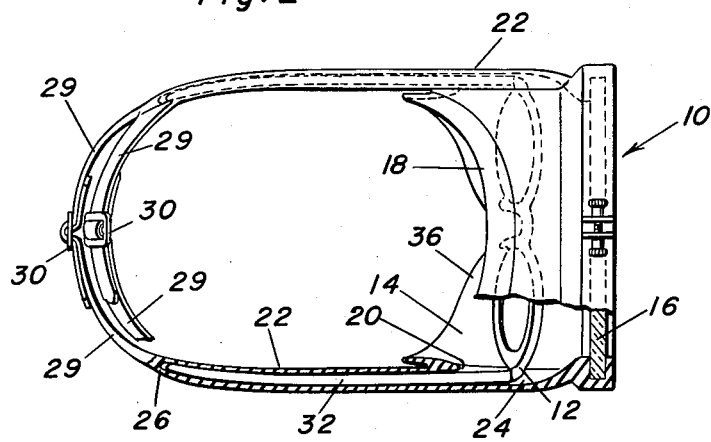
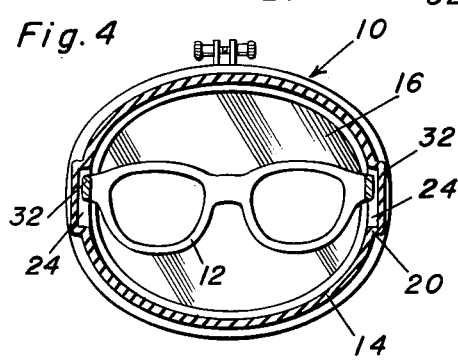
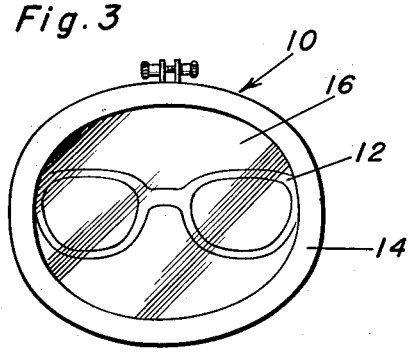
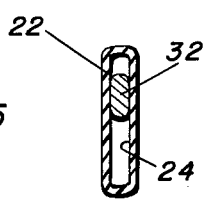
Frank T. Monahan, Jr.
Walter J. Weising
INVENTORS
BY *Clarence A. O'Brien*
*and Harvey B. Jacobson*
Attorneys United States Patent Office 2,993,209
Patented July 25, 1961

2,993,209
DIVING FACE MASK
Frank T. Monahan, Jr., 60 Church St., and Walter J. Weising, 30 Mead Ave., both of Byram, Conn.
Filed Aug. 11, 1959, Ser. No. 833,072
8 Claims. (Cl. 2—14)

This invention relates to a novel and useful diving face mask, and more particularly relates to a diving face mask which is constructed to enable a person wearing the mask to also wear glasses in the conventional manner.

Heretofore when skin divers or the like had eyesight requiring that they wear a form of eye lenses while swimming under the water it was necessary for the skin diver to either invest in a pair of extremely expensive contact lenses or it was necessary for him to have the glass front face of the diving mask ground to his eyeglass prescription. This latter solution, although the least expensive of the two, had a great many drawbacks inasmuch as in recent years skin divers have been descending to depths which would make the provision of a glass face in the diving mask dangerous. Of course, the front face of the mask could be constructed of a plastic material to overcome the danger of breaking a glass front face, but it has been found that prescription ground plastic front faces are also unsatisfactory inasmuch as skin divers are in the open sunlight a large percentage of the time and should a diver leave a mask having a plastic front face in the direct rays of the sun, the face of the mask could be permanently warped which would distort any prescription grinding of such a front face. Further, inasmuch as many people who have to wear glasses have to have their lenses changed frequently, the use of contact lenses or a face mask ground to their prescription would involve greater expense whenever the prescription of their glasses had to be changed.

The main object of this invention is to provide a diving face mask which will enable a person wearing glasses to use the mask while swimming under water without removing his glasses.

A further object of this invention in accordance with the preceding object is to provide a diving face mask having a pair of rearwardly extending hollow tube portions which open into the portion of the face mask normally sealed from the water so as to enable the wearer of the mask to use his glasses without getting the latter wet.

Still another object of this invention is to provide hollow tube portions which extend rearwardly from the face mask and terminate in flexible strap portions which may be removably secured together to form a band for retaining the diving mask upon the wearer.

Yet another object of the invention is to provide Y-shaped end portions for the free ends of each tube so that the corresponding ends of each Y-shaped portion may be removably secured together to embrace the rear portion of the head of a person using the diving face mask.

A final object to be specifically enumerated herein is to provide a diving face mask which will enable the wearer to use a pair of glasses while swimming under the water that is of simple construction conforming to conventional forms of manufacture so as to provide a device that will be durable and economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the diving face mask with a pair of glasses disposed therein being shown in phantom lines;

FIGURE 2 is a top plan view of the invention as seen in FIGURE 1 with parts thereof broken away and shown in section line;

FIGURE 3 is an end elevational view of the mask as seen from the right side of FIGURE 1;

FIGURE 4 is a vertical sectional view of the mask taken substantially upon a plane indicated by the section line 4—4 of FIGURE 1; and FIGURE 5 is a vertical sectional view of one of the tubes of the mask adapted to receive a temple of a pair of glasses taken substantially upon the plane indicated by the section line 5—5 of FIGURE 1.

Referring now more specifically to the drawings, the numeral 10 generally designates the diving face mask comprising the present invention shown with a pair of glasses 12 disposed therein, see FIGURES 1 and 2. The face mask 10 is in the form of a conventional diving mask having the usual hollow casing 14 with a transparent front wall 16 secured thereto. The rear end of the casing 14 is open and its rear edges are dimensioned and shaped to be adapted to conform to the contours of the face of a wearer as at 18 so that the mask will cover the nose and eyes (not shown) of a person wearing the mask. Formed in each of the side walls of the casing is an elongated opening 20 which has secured about its periphery the forward end of an elongated rearwardly extending tube 22. The tubes 22 are secured about the openings 20 in sealing engagement with the casing 14 so as to provide a pair of pockets 24 which open inwardly into the casing 14. It is to be understood that the openings 20 are in alignment with each other and they are of sufficient dimensions and so positioned to receive the temples of a pair of glasses being worn by a person also wearing the mask 10.

Each of the pockets 24 terminates at a point rearwardly of the ends of the temples 12 as at 26.

The tubes 22 each extend beyond the point 26 and terminate in Y-shaped end portions generally referred to by the reference numeral 28 with the two ends 29 of one of the Y-shaped end portions 28 being provided with suitable fasteners 30 engageable by the corresponding ends of the other Y-shaped end portion 28. Thus, it may be seen that the tubes 22 may also be used to encircle the head of a person wearing the diving face mask 10 to retain the latter in an operational position.

It will be noted, with attention drawn more particularly to FIGURE 5, that each of the hollow tubes 24 is flattened so as to conform to the sides of a person's head wearing the diving mask 10 and that the inside dimensions of the tubes 24 are sufficient in size to receive eyeglass temples 32 having end portions 34 which are adapted to engage the ears of the person wearing those glasses.

Further, it is to be noted that the openings 20 are of sufficient size to enable the mask to be used by persons wearing glasses having the bridges of their noses spaced different distances from their face.

With attention directed more particularly to FIGURE 4, it will be noted that the casing 14 is of such dimensions to receive and embrace a pair of eyeglasses whereas normally diving masks of ordinary construction are of sufficient width to span the distance between the eyes of a person wearing the mask.

With particular reference now to FIGURE 2 of the drawings it will be noted that the mask 10 including the tube portions 22 is constructed of a resilient material such as rubber and it will be further noted that the tube portions 22 are arcuate in shape with the free ends thereof curving toward each other so as to conform to and embrace the sides of the head of a person wearing the diving mask 10.

In operation, to insert the glasses into the mask 10, the temples 32 of the glasses 12 are moved to an open position and the free ends of the tubes 22 are bent upwardly so that the ends of the temples 12 may be inserted through openings 20 and into the tube 22 until the frame of the glasses has passed the lower rear lip 36 of the casing 14 whereupon the frame of the glasses 12 may then be centered therein which will allow the tubes 22 to return to their normal positions. When it is desired to remove a pair of glasses 12 from within the mask 10 the process is of course reversed.

It can thus be seen that herein described is a diving face mask which will enable a diver whose eyesight requires the use of glasses to use the latter while also benefitting from the use of the diving mask while swimming under water thus eliminating the necessity of the diver to resort to other more expensive methods of assisting his eyesight.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A face mask comprising a hollow casing having a transparent front end wall secured thereto and an open rear end, the rear edges of said casing being dimensioned and shaped to be adapted to fit over the eyes and nose and conform to the contours of the face of a wearer in fluid sealing engagement therewith, a pair of aligned openings formed in the side walls of said casing adapted to receive the temples of a pair of glasses of a wearer adjacent the frames, a hollow rearwardly extending tube having its forward end secured to said casing about the periphery of each opening in fluid sealing engagement with said casing, the free rear ends of said tubes being sealed, said tubes being of sufficient length and diameter to receive the temples of a pair of glasses positioned within the casing and worn by the wearer of said mask.

2. The combination of claim 1 wherein said tubes are flattened and vertically elongated so as to be adapted to conform to the sides of the head of a wearer and receive the temples of a pair of glasses having end portions for engagement with the ears of the wearer.

3. The combination of claim 1 wherein said openings are sufficiently elongated from front to rear to enable the mask to be used by persons wearing glasses having the bridges of their noses spaced different distances from their faces.

4. The combination of claim 1 wherein said tubes are resilient and extend beyond said pocket and are adapted to encircle the head of a wearer, the end of one of said tubes being provided with a retaining element engageable by the corresponding end of the other tube.

5. The combination of claim 4 wherein each of said tubes terminates in a Y-shaped portion, the two free ends of one of said Y-shaped portions being provided with retaining elements engageable by the corresponding ends of the other tube.

6. The combination of claim 1 wherein said casing and said tubes are constructed of a resilient material.

7. The combination of claim 6 wherein said casing and said tubes are integral.

8. The combination of claim 6 wherein said casing and said tubes are integral, said tubes being arcuate curving toward each other at their free ends.

References Cited in the file of this patent

UNITED STATES PATENTS

| | | |
|---|---|---|
| 1,949,595 | Willson et al. | Mar. 6, 1934 |
| 2,224,560 | Wentz | Dec. 10, 1940 |
| 2,388,713 | Schutz et al. | Nov. 13, 1945 |
| 2,715,222 | Sowle | Aug. 16, 1955 |
| 2,799,862 | Rowe | July 23, 1957 |
| 2,905,172 | Rodenhouse | Sept. 22, 1959 |